3,128,251
PREPARATION OF CONCENTRATED SILICA SOLS
Lewis E. Reven, La Grange Park, and Donald G. Blake, Villa Park, Ill., assignors to Nalco Chemical Company, Chicago, Ill., a corporation of Delaware
No Drawing. Filed Apr. 13, 1960, Ser. No. 21,883
5 Claims. (Cl. 252—313)

The present invention relates to a process for preparing aqueous silica sols. More particularly, the invention is directed to a method of preparing stable and highly concentrated silica sols.

Aqueous colloidal silica sols have been known for a number of years and have been the subject of extensive scientific investigation. These sols usually are prepared by removing all but a small portion of the alkali metal present in water glass (sodium silicate) to produce a colloidal system of what might be described as polymeric silicic acid.

One method of forming aqueous silica sols involves neutralizing a sodium silicate solution with a mineral acid. In this process, it is necessary to remove most of the salts formed in the neutralization reaction. This can be accomplished by dialysis or electrodialysis but these procedures are not suitable for use in plant scale operations. In U.S. Patent 1,539,342, a method is described in which silicon tetrachloride is hydrolyzed with water to produce a silica sol. In U.S. Patent 1,132,394, a dilute solution of sodium silicate is subjected to electro-osmosis to produce a silica sol in the anode compartment. In each of the above methods, it is necessary to remove by-products such as methanol, hydrochloric acid, or hydrogen sulfide which are formed by hydrolysis of the silicon compound, in order to produce a pure silica sol.

An improved process for conveniently preparing silica sols is described in the Bird Patent 2,244,325. In this process an alkali metal silicate solution is passed through an ion exchange material which removes most of the sodium ions and thereby forms silicic acid. A typical silicic acid solution produced by the Bird method contains about 3% $SiO_2$, 0.006% $Na_2O$, and about 0.003% sulfate. It has been found that the acidic sol produced by the Bird process, as well as by other methods, will gel in a few hours unless the sols are stabilized by the addition of an alkali.

One substantial disadvantage of many prior art methods of preparing silica sols is that the sols are only produced as relatively dilute solutions. In the Bird patent, for example, it is suggested that sols may be concentrated by evaporation only to a silica content of about 15%. A sol containing only 15% silica has many disadvantages. Such a product, for example, is uneconomical to ship and store because of its high water content. More recently, a method of concentrating sols to a silica content of about 35% was disclosed by Bechtold et al. in U.S. Patent 2,574,902. In this process a "heel" is formed by heating alkali stabilized sols of the Bird type to a temperature above about 60° C. The "heel" consists of large particles or nuclei of polymerized silicic acid. When additional quantities of the dilute sol are slowly brought into contact with the heel, the added silica polymerizes on the nuclei forming much larger particles. By this means the diameter of a typical Bird sol particle is increased from about 1 to 5 millimicrons up to from 15 to 130 millimicrons.

It is believed that colloidal silicic acid contains units of silica having a plurality of functional OH groups. These functional groups are extremely reactive and tend to form linkages with each other which in time produce a three-dimensional cross-linked polymer. When these colloidal particles aggregate the sol is rapidly converted to a gel. If the sol is concentrated at the time of aggregation, a strong and firm gel is produced.

There are a number of factors which affect the polymerization and gel forming tendencies of silicic acid. One factor is the concentration of the particular sol. Even the Bechtold et al. method of adding alkali stabilized sol to a heel to increase particle size is only effective in forming sols having a concentration of up to about 30% to 38%. Another important factor in determining the gel forming tendencies of sols is pH. For this reason, Bird, Bechtold et al., and other workers in the field found it necessary to add an alkali to the sols to maintain a negative charge on the silicic acid particles and to render the solution at least slightly alkaline.

The presence of impurities in a silica sol also influences its stability. With this fact in mind, Rule, in U.S. Patent 2,577,484, suggested that a concentration process should begin by treating a Bird type cation-free sol with an anion exchange resin so that the sol will also be substantially free of anions. Following the treatment of the dilute sol with the exchange resins, Rule formed a concentrated sol by the method described by Bechtold and Snyder in Patent 2,574,902. In making the heel sol, a sufficient amount of a strong base was added to adjust the pH of the sol to between 6 and 9. A build-up of the sol was effected by adding fresh, unheated, salt-free, and "active" silica to the heel sol while maintaining the pH in the range of from 7.5 to 10.7 and by thereafter heating the combined sols above 60° C. The products produced by the Rule method have an $SiO_2$ to $M_2O$ ratio in the range of from 130:1 to 500:1 and a particle size of from 10 to 130 millimicrons in diameter.

A unique method of concentrating sols is described in U.S. patent application Serial Number 551,529, now U.S. Patent No. 2,929,790. In this process, the $$SiO_2:Na_2O$$

ratio is controlled so that only a sufficient number of sodium ions are present to stabilize the sol.

While the above discussed methods are useful in preparing sols having an $SiO_2$ concentration of up to about 35% to 40%, they are not satisfactory for use in forming more concentrated sols. Additionally, certain of the above methods include expensive and time consuming processing steps which are not satisfactory in plant scale operations.

It is an object of the present invention to provide an improved method of preparing highly concentrated and stable silica sols.

Another object of the invention is to provide a simplified process for preparing concentrated silica sols.

Still another object is to provide a method of preparing silica sols which may be carried out using conventional equipment.

Other objects will become apparent to those skilled in the art from the following detailed description of the invention.

In general, the subject invention comprises the discovery that highly concentrated and stable silica sols can be prepared by controlling the characteristics of the sol which is fed to the heel sol. More specifically, it has been found that the addition of a feed sol having a particle size of from about 13 to 50 millimicrons and having an $SiO_2:Na_2O$ ratio of 150:1 to 350:1 to a heel sol having the same characteristics provides a constant volume concentration method which is capable of forming stable sols containing as much as 48% to 52% $SiO_2$. Our preferred $SiO_2:Na_2O$ ratio is from about 200:1 to 250:1.

In the practice of the invention, the silicic acid sol can be prepared by any known method. It is preferred, however, to use the method disclosed by Bird in U.S. Patent 2,244,325. In this process a dilute solution of an alkali metal silicate is passed through an ion exchange column at a sufficient rate to remove almost all of the alkali metal present in the silicate. The resulting sol is acidic and can be termed an acid silica sol.

In order to form an alkali stabilized sol, an alkaline material such as sodium or potassium hydroxide, or an alkali metal silicate, or a volatile base such as ammonia is added to the acid sol in sufficient quantity to adjust the pH to from about 8 to 11.

The alkali stabilized sols are used as the starting materials in a heel-feed concentration process such as is described by Bechtold et al. and Rule. In the Bechtold et al. process a stabilized sol of the Bird type is used as the feed. In the Rule patent the proper $SiO_2:Na_2O$ mol ratio is maintained in the product by simultaneously but separately adding alkali and fresh deionized feed sol to the heel. The Rule process includes the alternate possibility of having a sufficient amount of alkali present in the heel so that only fresh deionized feed sol need be used as the feed. In U.S. application Serial Number 551,529, it is suggested that acid sol be added to the alkaline heel sol in small increments with the evaporation of the water taking place so that the liquid volume of the system remains constant.

The addition of either acid sol or stabilized sol is continued in the subject process until the product reaches a silica concentration of from about 30% to 38%. The particle size of the silicic acid polymers should then be within a range of from about 13 millimicrons to about 50 millimicrons and the $SiO_2:Na_2O$ ratio should be from about 150:1 to 350:1.

In the prior art methods the addition of either stabilized sol or acid sol was continued beyond the 30% to 38% level if more concentrated products were desired. Such efforts, however, were unavailing in producing stable sols having concentrations greater than about 40% to 45%.

Applicants discovered that it was important to replace the original stabilized feed sol or acid feed sol with a feed having the particle size and the $SiO_2:Na_2O$ ratio described above. In this manner it is possible to produce a highly stable sol containing up to 52% $SiO_2$ by a constant volume process. The subject process is also advantageous in that it can be carried out in conventional constant volume apparatus.

The following examples will serve to illustrate the invention.

*Example I*

A process is described in this example which is suitable for use in preparing a commercial batch of the concentrated sol. In the method, 7,000 gallons of a 3.5% by weight $SiO_2$ sol obtained as an effluent from the Bird process is adjusted with sodium hydroxide to a pH of 8.5. The sol is then heated to about its boiling point in order to form a "heel." After the pH of the sol has risen to 10.0 it is assumed that a suitable "heel" has been formed. At this point acid sol produced by the Bird process is added to the boiling sol in suitable amounts to maintain approximately a constant volume. The acid sol will usually have an $SiO_2$ content of about 3.5%, a pH of about 3, and a particle size of about 1 to 3 millimicrons. The addition of the acid sol is continued until about 15,000 gallons has been used up. The pH of the resultant sol is about 8.9 to 9, and its specific gravity is approximately 1.255 which corresponds to an $SiO_2$ content of about 36%. The sol has an average particle size of about 18 millimicrons.

At this point the addition of the acid feed sol is stopped. A constant volume is maintained in the evaporator by adding additional amounts of the 36% sol. The particle size, pH, and concentration of the feed sol is found to be approximately the same as the heel sol at this point. The sol is vigorously agitated during this phase of the process. A steam blanket is also used to prevent the formation of a "crust" on the surface of the liquid. When the specific gravity of the sol reaches 1.396 at 68° F. the process is discontinued. This specific gravity corresponds to an $SiO_2$ concentration of 50%. The pH of a sol produced by this process was 9.1 and its conductivity was 4,200 mmh. The silicic acid particles had an average diameter of about 21.8 millimicrons.

A portion of a 50% sol prepared in accordance with the above described method was stored at room temperature to determine its stability. After 21 months this material was still stable.

*Example II*

In this example, 4 concentrated sols were prepared substantially as described in Example I. The concentration of the final products, and the concentration, particle size and pH of the feedstock, however, differed slightly in each instance.

| | Sol 1 | Sol 2 | Sol 3 | Sol 4 |
|---|---|---|---|---|
| Percent of $SiO_2$ when addition of acid sol was stopped | 30 | 34 | 35 | 37 |
| Percent of $SiO_2$ in concentrated feed | 32 | 30 | 34 | 35 |
| Particle size of heel sol when acid sol addition was stopped | 16 | 19 | 21 | 22 |
| Particle size of concentrated feed sol | 17.5 | 18 | 19.5 | 22.5 |
| Percent of $SiO_2$ in final product | 48.5 | 50 | 49 | 51.8 |
| Particle size of final product | 18 | 18.5 | 19.7 | 23 |
| pH of the final product | 8.7 | 8.8 | 9.1 | 9.2 |

Each of the above final products was stable almost indefinitely at room temperature. In storage tests, for example, the sols were still stable after 18 months. The viscosity of sol No. 4, however, was considerably higher than the viscosity of the other three products.

As was pointed out above, it is essential to the success of our invention that the particle size of both the concentrated heel sol and the concentrated feed sol be between 13 and 50 millimicrons. Our preferred range is between 17 and 25 millimicrons. For maximum stability it is also important that the final product have a pH from about 8.7 to about 9.2. A pH of up to 9.5 is also practical but these sols are not entirely satisfactory due to their higher sodium content. The subject method can, of course, be used to prepare sols having a concentration of less than 48% $SiO_2$. Its advantages, however, are most apparent where sols having from 48% to 52% $SiO_2$ are desired.

The method used to prepare the concentrated heel sol is not critical in the subject process. Either the Bechtold et al., and Rule methods, or the process described in U.S. patent application Serial Number 551,529, for example, can be used in preparing the concentrated heel sol. This sol should contain about 28% to about 38% $SiO_2$. The important characteristics of the sol, however, are its particle size, $SiO_2:Na_2O$ ratio, and pH. The concentration of the sol can take place under a vacuum, under atmospheric pressure, or under higher pressures.

Obviously, many modifications and variations of the invention as hereinbefore set forth may be made without departing from the spirit and scope thereof, and therefore only such limitations should be imposed as are indicated in the appended claims.

The invention is hereby claimed as follows:

1. A method of preparing stable silica sols having an $SiO_2$ content of up to about 52% which comprises: boiling a sol having (1) an $SiO_2$ content of from about 28% to 38%, (2) a particle size of from about 13 to about 50 millimicrons, and (3) a pH of from about 8.7 to about 9.5, in a reaction vessel while maintaining a substantially constant volume in said vessel by adding to said sol a feed sol having (1) an $SiO_2$ content of from about 28% to 38%, (2) a particle size of from about 13 to about 50 millimicrons, and (3) a pH of from about 8.7 to about 9.5, and continuing the addition of said feed sol until the product has the desired $SiO_2$ content, said content being greater than 28% and up to about 52%.

2. A method as in claim 1 wherein the particle size of said sols is between about 17 to about 27 millimicrons.

3. A method of preparing stable silica sols having an $SiO_2$ content of up to about 52% which comprises: boiling a sol having (1) an $SiO_2$ content of from about 28% to 38%, (2) a particle size of from about 13 to about 50 millimicrons, (3) a pH of from about 8.7 to about 9.5, and (4) an $SiO_2:Na_2O$ ratio of from about 150:1 to about 350:1, in a reaction vessel while maintaining a substantially constant volume in said vessel by adding to said sol a feed sol having (1) an $SiO_2$ content of from about 28% to 38%, (2) a particle size of from about 13 to about 50 millimicrons, (3) a pH of from about 8.7 to about 9.5, and (4) an $SiO_2:Na_2O$ ratio of from about 150:1 to about 350:1, and continuing the addition of said feed sol until the product has the desired $SiO_2$ content, said content being greater than 28% and up to about 52%.

4. A method as in claim 3 wherein the average particle size of said sols is between about 17 to about 27 millimicrons and the $SiO_2:Na_2O$ ratio of said sols is from about 200:1 to about 250:1.

5. A method as in claim 4 wherein the addition of the feed sol is continued until the product has an $SiO_2$ content of from about 48% to about 52%.

References Cited in the file of this patent

UNITED STATES PATENTS 2,833,724    Alexander et al. _____ May 6, 1958